(No Model.)
E. P. LYNCH.
NECK YOKE.
No. 375,080. Patented Dec. 20, 1887.
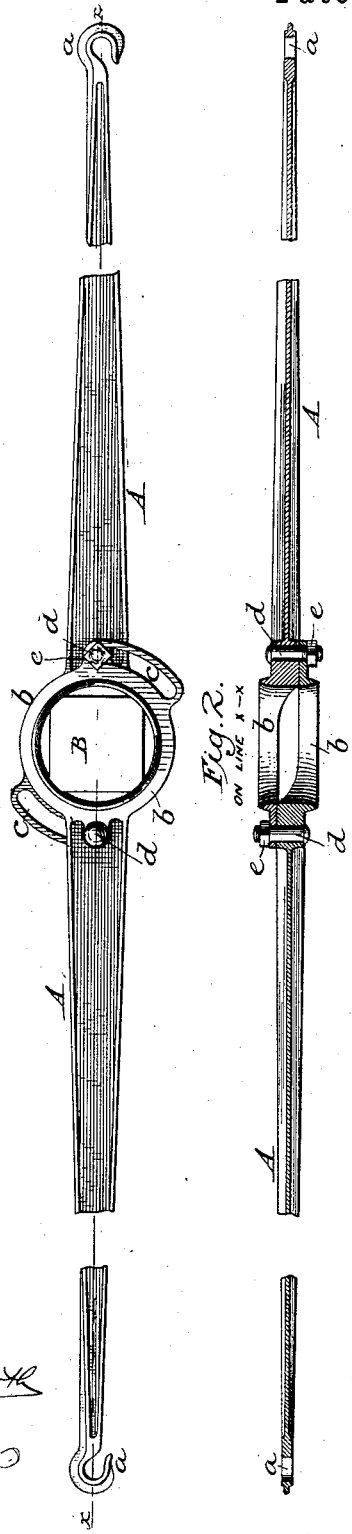

UNITED STATES PATENT OFFICE.

EDWARD P. LYNCH, OF DAVENPORT, IOWA.

NECK-YOKE.

SPECIFICATION forming part of Letters Patent No. 375,080, dated December 20, 1887.

Application filed May 28, 1887. Serial No. 239,687. (No model.)

*To all whom it may concern:*

Be it known that I, EDWARD P. LYNCH, of Davenport, in the county of Scott and State of Iowa, have invented certain Improvements in Neck-Yokes, of which the following is a specification.

In the use of certain classes of cultivators and other agricultural machines it is important to maintain the tongue or draft-pole in a horizontal or other definite position without reference to the height of the team; and it is the aim of my invention to provide a neck-yoke the middle or tongue-sustaining portion of which may be raised and lowered in relation to its ends at will.

To this end it consists, essentially, in a yoke consisting of two portions jointed together at their inner ends in such a manner that they may be placed and fixed at any required angle to each other. The inner ends of the parts may be formed and united by any suitable joint, which will admit of their adjustment in any manner desired; but I prefer, on account of its extreme simplicity and cheapness, the particular construction represented in the drawings.

In the accompanying drawings, Figure 1 represents a front elevation of my improved neck-yoke, and Fig. 2 a horizontal section through the same on the line *x x*.

Referring to the drawings, A A represent the two halves or ends of the yoke, each formed complete in one piece of malleable iron or other suitable material, its outer end being formed in a hook or eye, *a*, to receive the harness connections and its inner end fashioned into a large ring, *b*, adapted to encircle the end of the pole or tongue B.

Each of the parts is provided at one edge with a curved slot, *c*, and at the opposite edge with a hole to receive a bolt, *d*. The two ends are held together side by side with their central holes in register, and are united by means of the bolts *d*, passing through the slot of one part and into the hole in the other, with or without nut *e* on the outer end. When thus joined or articulated, the parts may be changed in their relation to each other by raising or lowering their ends and be fixed in the required position by tightening the bolts.

While it is preferred to form the parts with the opening, as described, they may be formed in any other suitable manner, which will adapt them to carry the end of the tongue.

If desired, the contiguous surfaces of the two parts may be serrated or toothed, in order to hold them the more securely in position.

I am aware that a neck-yoke has been constructed with a single pole-receiving socket and two oppositely-extended arms pivoted thereto to swing horizontally forward, a connecting-spring being applied to urge the arms forward and close them together, and stops being provided to limit their rearward motion. To this construction, which has no bearing upon my invention, I lay no claim. It is to be observed that the arms of my yoke are pivoted to move vertically instead of horizontally, and that they are combined with means by which their ends may be fixed at different heights in relation to the pole, a result which is not attainable under the construction above referred to.

Having thus described my invention, what I claim is—

1. A neck-yoke of rigid material jointed midway of its length, that its ends may swing vertically, and provided with means for fixing said ends at different heights in relation to the middle portion.

2. The neck-yoke consisting of the two members having their inner ends provided with openings overlapped on and connected by fastening-bolts extending through slots, substantially as described, whereby the two ends of the yoke may be fixed at different heights with reference to the middle portion.

In testimony whereof I hereunto set my hand in the presence of two attesting witnesses.

EDWARD P. LYNCH.

Witnesses:
T. V. SWINEY,
GEO. J. BARKER.